Sept. 21, 1926.
C. STEENSTRUP
ARTIFICIAL FISH BAIT
Filed June 23, 1924
1,600,652
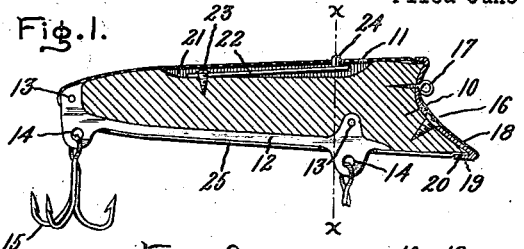
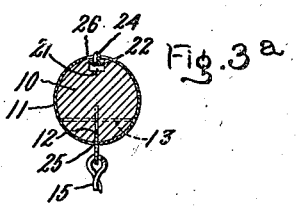
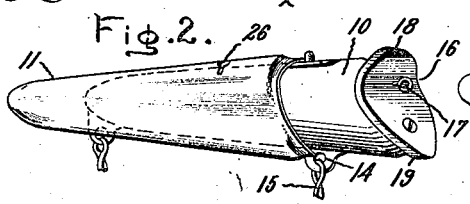
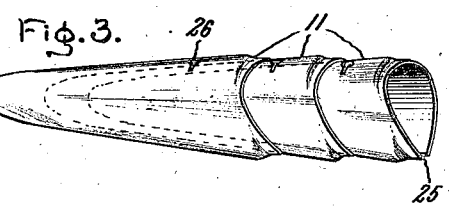
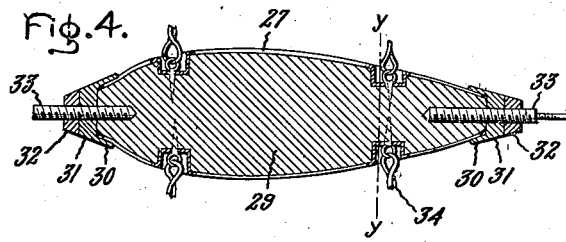
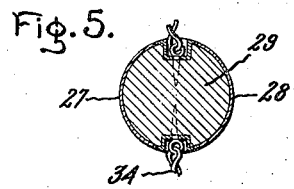
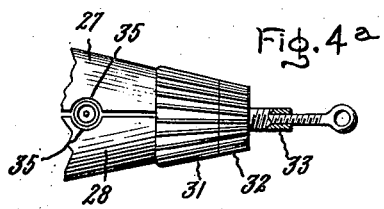
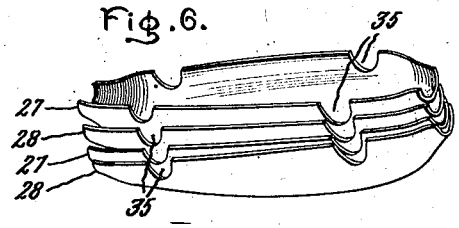
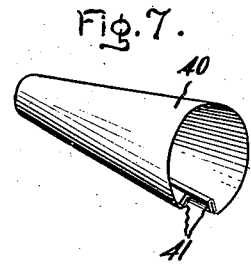
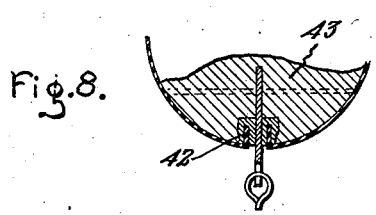
INVENTOR:
Christian Steenstrup,
by Alfred E. Bober
His Attorney.

Patented Sept. 21, 1926.

1,600,652

UNITED STATES PATENT OFFICE.

CHRISTIAN STEENSTRUP, OF SCHENECTADY, NEW YORK.

ARTIFICIAL FISH BAIT.

Application filed June 23, 1924. Serial No. 721,612.

The present invention relates to artificial fish baits of the type comprising a body to which one or more hooks are attached. Of this type are the baits known as plugs, wabblers, minnows and the like.

Such artificial fish baits are made up in many different colors and combinations of colors for use under different conditions and for fishing for different kinds of fish, and a fisherman to be well equipped for fishing finds it necessary to carry a large number of different colored baits. In fact it is not unusual for a fisherman to carry a number of dozen plugs, for example, all of the same size and differing only in color.

A fishing equipment of this character is not only expensive, but it becomes very bulky and inconvenient to carry, and with a large number of baits packed together it is often difficult to select quickly just the bait wanted at a particular time.

The object of the present invention is to provide an improved artificial fish bait which while providing a large number of different colors of baits is at the same time much less bulky than heretofore and capable of being provided at a much less cost. In fact by my invention a fisherman is enabled to have always at hand a very large number of different colored baits with scarcely any paraphernalia beyond that of a single plug, wabbler or the like.

According to my invention, I provide a body of suitable form to which the hook or hooks are attached and for use in connection with such body I provide as many different colored coverings or skins as may be desired. These coverings or skins are arranged to be put on the body to cover it and to be detachably fastened thereon in any suitable manner. By this means it will be seen that to obtain a bait of a desired coloration it is only necessary to put on the body a covering or skin of such coloration. The body may be made of any suitable material, such as wood for example, and may have any suitable contour, and the hook or hooks may be attached to it in any desired manner. The skins or coverings may be made likewise of any suitable material such as celluloid, thin metal, water proof cloth, or the like and may be arranged to be put on the body in any suitable manner, the essential thing being that they can be easily put on and removed, and that when put on they are held sufficiently firm so they are not likely to come off accidentally.

In the drawing, Fig. 1 is a longitudinal sectional view of an artificial fish bait embodying my invention; Fig. 2 is a perspective view showing a skin or covering partly on the body member of the bait; Fig. 3 shows several skins or coverings nested together for carrying; Fig. 3ª is a sectional view taken on line x—x, Fig. 1; Fig. 4 is a longitudinal sectional view of another embodiment of my invention; Fig. 4ª is a detail view of one end of Fig. 4; Fig. 5 is a sectional view taken on the line y—y, Fig. 4; Fig. 6 is a perspective view showing several of the skin members of Fig. 4 nested together; Fig. 7 is a perspective view of another form of skin or covering, and Fig. 8 is a detail sectional view showing the skin of Fig. 7 fastened on a plug.

Referring first to the embodiment of the invention illustrated in Figs. 1 to 3ª, 10 indicates a tapered body and 11 indicates coverings or skins each of which is adapted to be placed on such body. In the present instance, the body is shown as being in the form of what is usually termed a plug or wabbler. It is provided in its bottom with a metal insert 12 fastened in place by pins 13 and provided with eyes 14 in which hooks 15 are fastened. Ordinarily, a plurality of hooks is provided as is shown in the drawing, but in some cases only a single hook may be used and hereinafter I have used the term hook means, meaning thereby either a single hook or a plurality of hooks. The forward end of the body is dished as is indicated at 16 and is provided with an eye 17 to which the fish line is attached. The forward end of the body is provided also with a metal cap 18 having a flange 19 which surrounds the body in spaced relation thereto so as to provide an annular groove or pocket 20. In the top of body 10 is a groove 21 in which is a strip of spring metal 22 fastened by a screw 23 and provided with a locking button 24 at its free end.

The coverings or skins 11 comprise tapered sleeves of a shape to slide over and fit on body 10. They are slotted longitudinally along their bottoms as is indicated at 25 so as to slide past eyes 14 and their forward ends are shaped to fit into annular groove or pocket 20. In the tops of skins 11 are holes 26 which receive locking buttons 24.

In Fig. 1 a skin is shown as being in position on the body, the forward end of the skin being in annular groove or pocket 20 and button 24 being in hole 26. In Fig. 2 the covering or skin is shown as being partly removed from the body. In Fig. 3 several skins or coverings are shown nested together, this being the manner in which they are packed for carrying. It will be seen that when nested in this manner a very compact bundle is formed so that a considerable number can be easily carried. It will be understood that the several skins or coverings have different colorations, and having them nested makes the selection of any desired color a simple and easy matter for the entire collection can be readily looked over and the selection made.

Assuming that a skin or covering of one coloration is on the body and that it is desired to have a bait of a different color, it is only necessary to push down on button 24, pull the one covering off, and then slip another on in its place.

In Figs. 4 to 6 I have shown another form of my invention wherein each covering or skin is made in the form of complementary halves 27 and 28 which fit onto the body 29 and are fastened thereon by the flanges 30 on nuts 31 and the lock nuts 32, such nuts screwing onto end pins 33. This particular bait is shown as being provided with four hooks 34 and the coverings or skins are provided with recesses 35 so as to fit around the hooks. Coverings or skins of this form may be nested as is illustrated in Fig. 6. They are easily removed from the body 29 by screwing back the nuts 32 and 31, and as easily fastened on again by screwing such nuts up again as is obvious from an inspection of the drawing. Pairs of skins of as many different colors as desired may be provided.

The skins as shown in either Fig. 3 or in Fig. 6 may with advantage be made either from thin metal or from celluloid.

In Figs. 7 and 8 is illustrated an embodiment of my invention wherein the skins or coverings 40 have reinforced edges 41 which fit into longitudinally extending grooves 42 in the body 43, the coverings being slipped on from the end of the body or wrapped around it and the two ends fastened into the groove.

By my invention it will be seen that a fisherman need carry only one plug with the hooks attached thereto, and along with it the desired number of coverings or skins. The coverings or skins readily nest together and take up but little space. They embody no hooks and hence may be placed directly in the pocket if desired. This makes their use very convenient.

In accordance with the provisions of the patent statutes, I have described the principle of operation of my invention, together with apparatus which I now consider to represent the best embodiments thereof, but I desire to have it understood that the constructions shown are only illustrative, and that the invention can be carried out by other means.

What I claim as new and desire to secure by Letters Patent of the United States is:—

1. In an artificial fish bait, the combination with a body having hook means attached to it, of a covering of suitable coloration detachably mounted on the body, said covering being split longitudinally in line with the hook means on the body whereby it may be attached to and removed from the body without necessitating the removal of the hook means, and means releasable without detaching the hook means for fastening the casing on the body.

2. In an artificial fish bait, the combination with a body having hook means attached to it, of a covering which may be put on said body, said covering being split longitudinally in line with the hook means whereby it may be attached to and removed from the body without necessitating the removal of the hook means, and means at the forward end of said body for attaching the covering to the body.

3. An artificial fish bait comprising a body member, hook means attached to the body member, a one-piece covering for the body, said covering being split longitudinally in the line of the hook means whereby it may be placed on the body without removing the hook means, and means releasable without detaching the hook means for holding the covering on the body.

4. An artificial fish bait comprising a body member, hook means attached to the body member, a one-piece covering for the body, said covering being split longitudinally in the line of the hook means whereby it may be slipped onto the body from one end, and means releasable without detaching the hook means for holding the covering on the body member.

5. In an artificial fish bait, the combination with a body having hook means attached to it and means at one end which defines a surrounding groove, of a longitudinally split covering adapted to be slipped onto the body to bring its end into said groove, and detachable means for fastening the covering to said body.

6. In an artificial fish bait, the combination with a body having hook means attached to it and means at one end which defines a surrounding groove, of a longitudinally split covering adapted to be slipped onto the body to bring its end into said groove, said covering being provided with an opening, and a spring locking member which engages said opening to hold the covering in position on the body.

7. A fish bait comprising a tapered body, a tapered covering made of relatively hard material which is adapted to be slipped longitudinally onto the body, hook means attached to the body, said covering being slotted longitudinally in line with the hook means whereby it may be put on the body without removing the hook means, and means adjacent the forward end of the body and releasable without detaching the hook means for fastening the covering to the body.

8. In an artificial fish bait, the combination of a body having hook means attached to it, a readily removable covering on the body, said covering being split longitudinally in line with the hook means whereby it may be placed on and removed from the body independently of the hook means, means at the end of said body for holding the end of said covering, and detachable means for fastening the covering to said body.

9. An artificial bait of the character described having a tapering body portion, a substantially conical shell split longitudinally replaceably fitted on the exterior wall of the tapering portion of said body portion, and a locking member carried by said body member for securely locking said shell against dislodgement from said body member.

10. An artificial bait of the character described comprising a body member having a tapering body portion, a hook supporting means carried by said body portion intermediate its length, a substantially conical shell split longitudinally replaceably fitted on the exterior wall of the tapering body portion, whereby the split portion of said shell may permit the movement of said shell beyond said hook-supporting means, and locking means carried by said body portion for engaging with said shell to prevent dislodgment therefrom.

In witness whereof, I have hereunto set my hand and seal this 20th day of June, 1924.

CHRISTIAN STEENSTRUP.